Feb. 14, 1950     R. A. CARPENTER ET AL     2,497,069
SERVO SYSTEM TESTING
Filed Jan. 15, 1946
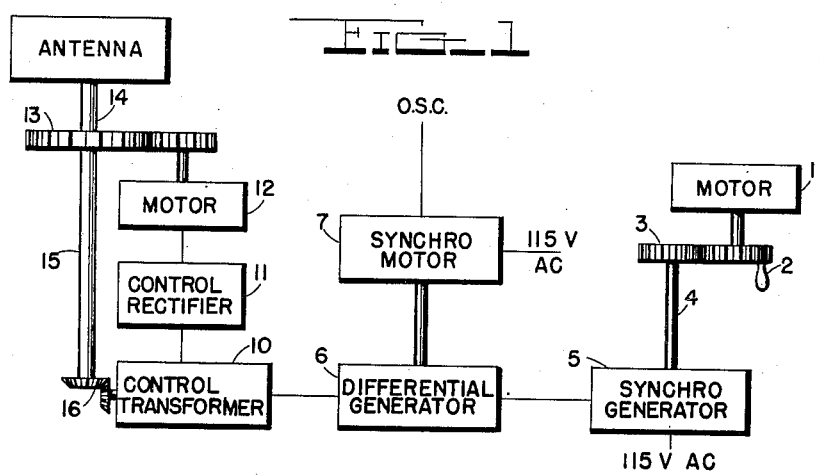
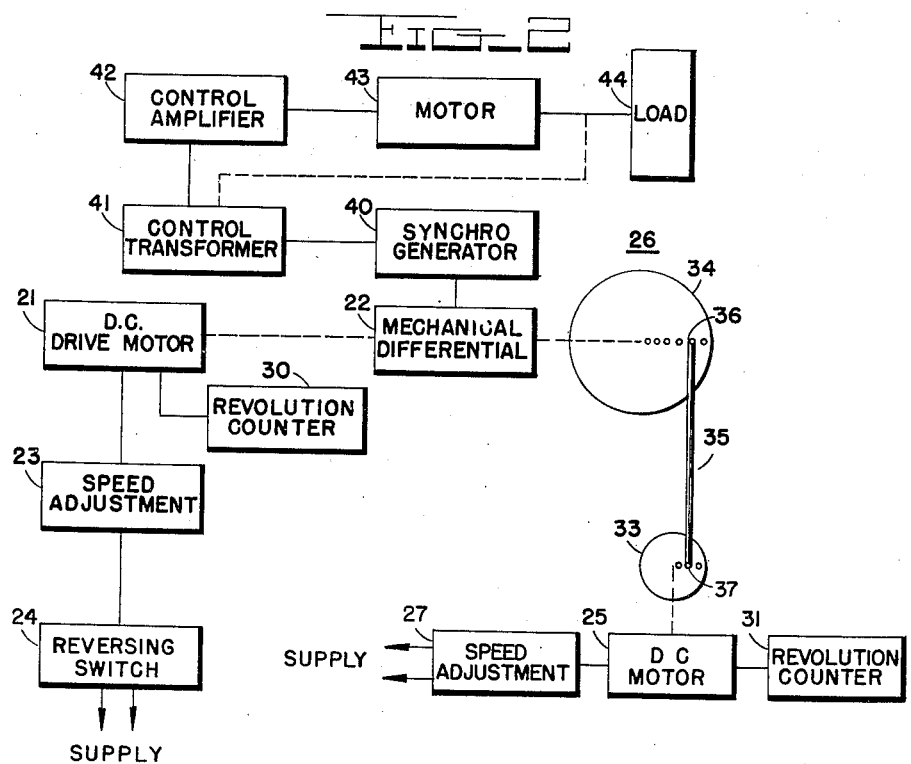
INVENTORS
RALPH A. CARPENTER
DONALD M. LOWE
BY
*ATTORNEY*

Patented Feb. 14, 1950

2,497,069

UNITED STATES PATENT OFFICE 2,497,069

SERVO SYSTEM TESTING

Ralph A. Carpenter and Donald M. Lowe, Washington, D. C.

Application January 15, 1946, Serial No. 641,362

5 Claims. (Cl. 73—1)

(Granted under the act of March 3, 1883, as amended April 30, 1928; 370 O. G. 757)

This invention relates to the production of a mechanical movement to be applied to servo systems for testing purposes.

Automatic control has a wide variety of applications. Servo systems are useful on ships, for instance, in connection with antenna drive systems, and fire control director systems for moving guns in train and elevation to bring them on a target. In such an installation, an antenna or gun might be required to take on a rotary motion, an oscillatory motion, or some combination of these motions.

In order to test the operation of a control system or units thereof in the laboratory, it is desirable to simulate the mechanical or electrical inputs received in the actual installation. Furthermore, a portable servo test unit would be useful for imparting such signals or movements to the units of a shipboard installation, for some parts of the system may be inoperative or operative with difficulty at the time the test is to be made.

It is an object of the invention to provide continuous or oscillatory rotational movements for testing automatic control systems.

It is another object of the invention to provide a mechanical movement to test the effectiveness of servomotors or generators, or servo or control amplifiers, or antenna driving systems.

The invention will be further understood with reference to the drawing in which:

Fig. 1 shows in block diagram an exemplary antenna control system in connection with the testing of which the invention may be employed.

Fig. 2 shows in block diagram an exemplary embodiment of the invention.

In the control system of Fig. 1, the antenna is caused to move in response to the rotation of a slewing motor or hand crank plus the ship's changes of course. The motion of motor 1 or of hand crank 2 is communicated through gear 3 and shaft 4 to the rotor of synchro generator 5. The rotor is a coil free to rotate inside a fixed stator coil, the rotor being energized by the ship's A.-C. supply. The motion of the rotor of generator 5 causes an electrical signal to be induced in the windings of the stator, which signal is communicated to the stator of the differential generator 6. A voltage is thus induced in the rotor of the differential generator which depends on the motion of the hand crank or slewing motor. The rotor of the differential generator 6 is rotated in response to the ship's change of course by motor 7. When the rotor of 6 moves due to a change of course, the voltages induced in it by the signal in the stator change in phase and amplitude. Hence, the voltages in the rotor depend on the combined motions of the slewing motor or hand crank and the change in course.

These voltages appearing at the stator of control transformer 10 result in an error voltage appearing in its rotor depending upon its position relative to the rotors of generators 5 and 6. This error signal is employed by control rectifier 11 to energize the antenna driving motor 12, which rotates the antenna through gear 13 and shaft 14. The motion of the antenna is fed back through shaft 15 and gear 16 to drive the rotor of control transformer 10 toward the position of no error signal.

Therefore, if the hand crank is turned slightly or the ship makes a small change of course, a small error signal is produced in the rotor of the control transformer 10 due to the sum of the motions. The antenna will be driven until the control transformer rotor is moved back to the no error signal position, the antenna thus taking on the combined motion of the hand crank and the ship's change of course. If the slewing motor or hand crank is moved continuously and the ship constantly changes course, the antenna will move continuously in response to these movements. The antenna might be given, for example, a combination of a continuous and oscillatory rotational motion, if the ship steers a zigzag course while the slewing motor 1 rotates continuously.

The exemplary embodiment of the invention shown in Fig. 2 is a device used in testing automatic control systems, of which the system of Fig. 1 is merely one typical example. The invention imparts movements to such a system simulating those occurring in an actual installation.

A D.-C. drive motor 21 imparts a rotary motion through a gear reduction to the spider of mechanical differential 22. The speed of this motion can be varied by a potentio-meter or other speed adjusting device 23. The direction of rotation can be changed by the reversing switch 24.

The rotary motion of motor 25 is changed to an oscillatory motion about a fixed axis by reciprocating mechanism 26. The speed of motor 25 may be adjusted by control 27. The movement of the motor is ordinarily applied through a gear reduction to the reciprocating mechanism. Motors 21 and 25 may be provided with revolution counters 30 and 31.

The reciprocating mechanism 26 consists of two wheels 33 and 34 with a connecting rod 35 attached to the eccentrics 36 and 37. The resulting motion given the differential 22 by the mechanism 26 is approximately simple harmonic. Its period depends on the speed of the motor and its amplitude on the relative radii of the two eccentrics. The wheels are drilled with a series of holes in order that the shaft may be attached at each of its ends at varying distances from the centers of the wheels. Other devices known to the art for producing oscillatory movements may be used instead of mechanism 26.

The simple harmonic motion of mechanism 26 is applied to differential means 22, where it is combined with the rotary motion from motor 21 to produce the resultant of the two motions. It is to be understood, however, that in some applications, the motions might be combined electrically rather than mechanically.

The resultant motion referred to in the above paragraph is an oscillatory rotational movement. The variable rotation of the differential output shaft may or may not involve actual reversal of the shaft depending on the relative speeds of the two motors 21 and 25. Moreover, if motor 21 only is energized, rotation at uniform angular velocity results. If motor 25 only is energized the resultant is oscillatory motion only.

As shown in Fig. 2, the output of differential 22 is applied to the synchro system to be tested. Such a system, for simplicity, has been shown as comprising only a synchro generator 40, a control transformer 41, a control amplifier 42, a motor 43, and a load 44. The resultant motion of differential 22 is applied to the rotor of synchro generator 40, causing an electrical signal to appear in the stator windings. This electrical signal, fed to the control transformer 41, results in an error voltage output dependent on the relative positions of the generator 40 rotor and the control transformer 41 rotor. Since the control transformer rotor is positioned by a feed back shaft and gearing from the load 44, this error signal depends on the misalignment of the load and the differential 22 output shaft. The error voltage is fed from the control transformer to the control amplifier 42, which furnishes current to motor 43 to drive the load 44 to correspondence with the differential 22 output shaft. The system is so arranged that the load follows closely the output motion of the differential.

In certain applications the synchro generator 40 might be a component of the test unit itself. For other applications, other synchro units might replace the synchro generator.

By use of suitable measuring devices known to the art, such as a cathode ray oscilloscope fed by the error voltage of the system, various quantities which give an indication of system or unit performance can be determined.

While but one embodiment of this invention has been shown and described, it will be understood that many changes and modifications may be made therein without departing from the spirit or scope of the present invention.

The invention described herein may be manufactured and used by or for the Government of the United States of America for governmental purposes without the payment of any royalties thereon or therefor.

What is claimed is:
1. A test device for a servo control system which includes a synchro generator comprising two variable speed motors, a differential coupled to one of said motors driving the synchro generator, oscillatory means coupled to the other motor operative to change the rotary motion thereof to a substantially simple harmonic motion, and means coupling the oscillatory means to the differential means.

2. A test device for a servo control system which includes a synchro generator comprising differential means including a plurality of input means and an output means, means coupling the output means of said differential means to said synchro generator, motor means applying a rotational motion to one of said input means and oscillatory means applying a simple harmonic motion to another of said input means.

3. A test device for a servo control system which includes a synchro generator comprising differential means including a plurality of input means and an output means, means coupling said output means to said synchro generator, motor means applying a rotational motion to one of said input means, oscillatory means applying a simple harmonic motion to another of said input means, motor controlled means for varying the rate of said rotational motion and control means for varying the amplitude and period of said simple harmonic motion.

4. A test device for a servo control system which includes a synchro generator comprising differential means including a plurality of input means and an output means, means coupling said output means to said synchro generator, motor means applying a rotational motion to one of said input means, oscillatory means applying a simple harmonic motion to another of said input means, motor control means for determining the rate and direction of said rotational motion and control means for determining the amplitude and period of said simple harmonic motion.

5. In combination, a synchro generator having input and output means, differential means including a plurality of input means and an output means, means coupling the output means of said differential means to the input means of said synchro generator, motor means applying a rotational motion to one of said differential input means and oscillatory means applying a simple harmonic motion to another of said differential input means.

RALPH A. CARPENTER.
DONALD M. LOWE.

REFERENCES CITED

The following references are of record in the file of this patent:

UNITED STATES PATENTS

| Number | Name | Date |
| --- | --- | --- |
| 504,056 | Sinclair | Aug. 29, 1893 |
| 1,368,755 | Roddey | Feb. 15, 1921 |
| 1,560,435 | Sperry | Nov. 3, 1925 |
| 2,237,919 | Wied | Apr. 8, 1941 |
| 2,413,847 | Ross et al. | Jan. 7, 1947 |
| 2,419,210 | Hanna et al. | Apr. 22, 1947 |
| 2,422,180 | Broadbent | June 17, 1947 |
| 2,468,635 | Maystead | Apr. 26, 1949 |